| United States Patent [19]
Stevenson

[11] 3,867,544
[45] Feb. 18, 1975

[54] 4-NITRO-4'-(TRIFLUOROMETHYL) CARBANILIDE EMPLOYED IN ANIMAL HUSBANDRY

[75] Inventor: Graham T. Stevenson, Midland, Mich.

[73] Assignee: The Dow Chemical Company, Midland, Mich.

[22] Filed: Apr. 1, 1970

[21] Appl. No.: 24,814

[52] U.S. Cl. ............................ 424/322, 260/553 C
[51] Int. Cl............................................ A61k 27/00
[58] Field of Search.................. 424/322; 260/553 C

[56] References Cited
OTHER PUBLICATIONS

Martin et al. – Chem. Abst., Vol. 71, 1969, p. 91056c.

Bruce et al., – Chem. Abst., Vol. 63, (1965), p. 2321g.

Primary Examiner—Sam Rosen
Attorney, Agent, or Firm—S. Preston Jones

[57] ABSTRACT

Animals are treated by oral administration of 4-nitro-4'-(trifluoromethyl)carbanilide to allow maximum normal growth of the animals by the control of protozoan organisms and mitigate against the attack of gastrointestinal parasites.

6 Claims, No Drawings

4-NITRO-4'-(TRIFLUOROMETHYL) CARBANILIDE EMPLOYED IN ANIMAL HUSBANDRY

BACKGROUND OF THE INVENTION

This invention relates to animal husbandry and more particularly to methods and compositions adapted to be employed to allow maximum normal growth of animals, for controlling protozoan organisms and for mitigating against the attack of gastrointestinal parasites. The term "animal" as used herein is employed in context of its general definition and is meant to include fowl, particularly domesticated fowl; i.e. poultry.

It is an object of the present invention to provide a new and improved practice for raising and benefiting animals such as rabbits, lambs, calves, chickens, guinea fowl, pigeons, geese, turkeys and other domesticated animals and to provide a new and improved method and composition for mitigating against and protecting animals from the attack of gastrointestinal parasites. Still another object is to provide a method and composition which may be employed prophylactically to protect animals from the attack of gastrointestinal parasites without adversely affecting the normal physiological processes.

SUMMARY OF THE INVENTION

The present invention comprises a novel composition and method for orally administering to animals employing 4-nitro-4'-(trifluoromethyl)carbanilide as the active agent.

The practice allows maximum normal growth of the animals and protects the animals from parasitic diseases of the gastrointestinal tract and particularly from coccidiosis. Further, the practice protects the animals from mixed coccidial infections and from the various strains of the same species of coccidial organism and particularly from the various strains of *Eimeria tenella*, *Eimeria necatrix*, *Eimeria acervulina*, *Eimeria maxima* and *Eimeria brunetti*. Also, while protecting the animals from coccidiosis, the practice allows the protected animals which are exposed to the coccidial infection to develop acquired immunity to the disease.

The carbanilide compound is a crystalline solid and is adapted to be administered to animals. The compound is not repellent to animals and can be employed in admixture with grain rations, animal feeds or drinking water. It can be administered continuously or intermittently in dosages sufficient to allow maximum normal growth and utilization of feed and to protect the animal from the attack of gastrointestinal parasites without adversely affecting the normal physiological processes, or without imparting any unpalatable characteristic to animal flesh.

The oral administration of an effective dosage of the compound is essential and critical for the practice of the present invention. In general, good results are obtained when the animals are fed a daily dosage of from about 3 to about 1,000 parts of the compound per million parts of dietary intake, and preferably from about 15 to about 250 parts per million parts of dietary intake. Where danger of re-exposure to the attack of intestinal parasites from contaminated feed or surroundings is low, good results are obtained when the animals are fed a daily dosage of about 60 parts or more per million parts of dietary intake. By the term "dietary intake" is meant grain rations, animal feeds and/or drinking water.

The method of the present invention can be carried out by the oral administration of the unmodified compound. However, the present invention also embraces the employment of a liquid, powder, mash, pellet, capsule or other animal food containing said compound. In such usage, the compound can be modified with one or more of a plurality of additaments including water, ethanol, skim milk, edible oils, propylene glycol, syrups, grain rations, surface active dispersing agents such as the liquid and solid emulsifying agents and solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. Further, the compositions are adapted to be fed to animals to supply the desired dosage of active agent, or to be employed as concentrates and subsequently diluted with additional carrier to produce the ultimate compositions.

The exact concentration of the compound to be employed in the composition can very provided that enough of the composition is ingested by the animal so as to provide the required internal amount of active ingredient as set forth hereinbefore. For example, where direct administration to the individual animal is preferred, liquid or solid compositions containing from 5 to 98 percent by weight of the agent conveniently are employed to supply the desired dosage. Where the compound is provided as a constituent of the principal food ration, satisfactory results are obtained with food rations containing a minor but effective amount of the compound. The exact amount of the compound in the ration is dependent upon the food consumption and feeding habits of the animal concerned. With most animals, the required dosage can be supplied with mash compositions containing from 0.001 to 0.1 percent by weight of active material when fed as the principal food ration. The compound can also be furnished in the drinking water by conventional formulation techniques.

In liquid compositions to be employed as concentrates, the active agent can be present in a concentration of from 5 to 98 percent by weight. Preferred concentrate compositions oftentimes contain two or more percent by weight of a liquid or solid surface active agent.

Liquid compositions containing the desired amount of the compound can be prepared by dissolving the compound in ethanol, propylene glycol or an oil or by dispersing it in water with or without the aid of a suitable surface active dispersing agent such as an ionic or non-ionic surface active agent. Suitable surface active dispersing agents include the glycerol and sorbitan esters of fatty acids and the polyoxyalkylene derivatives of fatty alcohols and of sorbitan esters. The aqueous compositions can contain one or more water-immiscible oils as a solvent for the active agent.

In the preparation of solid feed compositions, the compound can be mechanically ground with an innocuous solid such as cereal meal, oyster shell flour, or a solid surface active dispersing agent such as finely divided bentonite or fuller's earth. These compositions can be administered in the form of capsules or tablets or dispersed in an animal feed and such feed used to supply a part or all of the ration. Alternatively, the compound can be dissolved in an organic solvent such as alcohol or acetone and the resulting mixture dispersed in an animal feed which is then dried to remove the solvent. The compound can also be dispersed in an edible oil such as coconut, olive, cottonseed or peanut oil and the resulting mixtures dispersed in the feed. These edible oil compositions can contain one of the aforementioned emulsifying materials as a dispersing agent.

In addition to poultry feeds containing a minor amount of the active compound as an effective anticoccidial agent, there are provided in accordance with an additional aspect of this invention poultry feed supplement compositions wherein the heretofore described compound is intimately dispersed in, or admixed with, a suitable non-toxic diluent or carrier. The carrier vehicle employed in these supplement compositions should be one in which the cocidiostat is stable, which is compatible with a finished poultry feed and which can be administered with safety to the animals. These feed supplements, which contain a significantly higher percentage of coccidiostat than does the finished feed, are mixed with or blended into the feedstuff. In order to assure uniform distribution of the coccidiostat in the finished feed, it is customary to employ an intermediate dilution step in which the supplement is blended with a portion of the final feed, and this "intermediate mix" is then added to the remainder of the feed with adequate mixing. The coccidiostat compound described hereinabove may be formulated into feed supplement compositions containing from about 0.25 percent to about 30 percent by weight of the active ingredient. It will, therefore, be appreciated that the preferred supplement concentration will depend to a large extent on the final use level desired. With the compound of this invention, feed supplement compositions containing from about 1–20 percent by weight of active ingredient are quite suitable.

The diluents normally employed for these poultry feed supplements are solid orally ingestible poultry feed additives such as distillers' dried grains, corn meal, citrus meal, fermentation residues, ground oyster shells, Attapulgus clay, wheat middling, wheat shorts, molasses solubles, corn cob meal, corn gluten feed, corn germ meal, edible vegetable substances, soybean meal, dehulled soya flour, soybean mill feed, antibiotic mycelia, crushed limestone, soya grits and the like. This dilution serves to facilitate uniform distribution of the substance in the finished feed. The finished feed is one that contains, a source of fat, protein, carbohydrate, minerals, vitamins and other nutritional factors.

The following Examples will serve to further illustrate the present invention but are not meant to limit it thereto.

EXAMPLE 1

4-Nitro-4'-(trifluoromethyl)carbanilide is dispersed in commercial poultry mash to produce animal feed compositions containing pre-determined amounts of the compound. Portions of these compositions and unmodified mash are fed as a sole feed ration to flocks of chickens of the same history and past environment which are about 17 days old. One day after the diets are begun, 50,000 sporulated *Eimeria necatrix* oocysts or 5,000,000 sporulated *Eimeria acervulina* oocysts are introduced directly into the crop of the birds. The difference in the inoculation rate reflects the difference in the challenge necessary for each coccidial organism to give a 100 percent degree of pathogenicity. Another flock of birds is left untreated and uninoculated to serve as an uninfected check. Seven days following the initiation of the diets, the birds are sacrificed, autopsied and an examination made to determine the percent control of coccidiosis and of the coccidial organisms. The present control of coccidiosis and the coccidial organisms obtained in the evaluations at the indicated percent by weight of carbanilide compound in the diets as well as in the infected and uninfected checks is set forth below in Table I.

Table I

| Agent Employed in Diet | % by weight of agent in feed | % Control of Coccidiosis and the Coccidial Organisms: *Eimeria necatrix* | *Eimeria acervulina* |
|---|---|---|---|
| 4-nitro-4'-(trifluormethyl-carbanilide | 0.0062 | 100 | 77 |
| | 0.0050 | ~50 | 91 |
| | ~0.0030 | ~50 | 84 |
| Infected Check (Control) | 0 | (1) | (1) |
| Uninfected Check (Control) | 0 | (2) | (2) |

(1) All birds heavily infected with coccidial organisms
(2) No coccidial organisms or disease

EXAMPLE 2

Twenty-five percent by weight of 4-nitro-4'-(trifluoromethyl)carbanilide is ground with 75 parts of fuller's earth to prepare dispersible concentrates. A portion of the latter composition is dispersed in commercial poultry starting starting mash to produce a medicated feed composition containing 0.004 percent by weight of one of the agents.

The medicated feed composition and unmodified starting mash are fed as a sole feed ration to groups of chickens of the same history and past environment. Each such test group consisted of three birds which are two weeks of age. Forty-eight hours after the initiation of the diets, 50,000 sporulated *Eimeria necatrix* oocysts are introduced directly into the crop of each bird. After the end of the fifth and seventh day following the inoculation, the birds are weighed and the average weight for each test group, determined. Another group of birds was left untreated and uninoculated to serve as an uninfected check. The average weights of each test group at the aforementioned intervals, the percent weight increase and percent control of coccidiosis for each test group are set forth in Table II.

Table II

| Active agent at dosage of 0.004 weight percent of feed | Average weight per test group in grams at the indicated intervals following inoculation | | | Percent weight increase of test group | Percent control of coccidiosis and coccidial organisms |
| --- | --- | --- | --- | --- | --- |
| | 0 day | 5 days | 7 days | | |
| 4-nitro-4'-(trifluoromethyl)-carbanilide | 457 | 639 | 681 | ~50 | ~70 |
| Uninfected checks (Control) | 420 | 599 | 686 | 38 | (1) |
| Infected checks (Control) | 447 | 628 | 580 | 30 | (2) |

(1) No coccidial organisms or disease
(2) All birds heavily infected with coccidial organisms

EXAMPLE 3

In a similar operation, a portion of the concentrate of Example 2 is dispersed in commercial poultry starting mash to produce a medicated feed composition containing 0.005 percent by weight of the active agent.

This medicated feed composition and unmodified starting mash are fed as a sole feed ration to groups of chickens of the same history and past environment. Each such test group consisted of three birds which are two weeks of age. Forty-eight hours after the initiation of the diets, 5,000,000 sporulated *Eimeria acervulina* oocysts are introduced directly into the crop of each bird. After the end of the fifth and seventh day following the inoculation, the birds are weighed and the average weight for each test group, determined. Another group of birds was left untreated and uninoculated to seve as an uninfected check. The average weights of each test group at the aforementioned intervals and the precent weight increase for each test group are set forth in Table III.

EXAMPLE 5

In another operation, 20 parts by weight of 4-nitro-4'-(trifluoromethyl)carbanilide is mechanically mixed with 80 parts of soybean meal to produce an animal feed composition containing 20 percent of the active compound. When this composition is dispersed in commercial animal feed to produce animal feed compositions containing from 0.001 to 0.006 percent by weight of the active compound and fed to chickens, results of weight gains and control of coccidial organisms substantially as described hereinbefore are obtained.

In a further embodiment, the carbanilide compound as employed in accordance with the present invention, or compositions containing the same, advantageously can be employed in the present methods in combination with one or more other feed additives including agents active against gastrointestinal parasites, as supplemental materials. Representative additives and agents include 2-sulfanilamidoquinoxaline, acetyl(p-nitrophenyl) sulfanilamide, sulfadimethylpyridine, Table III

| Active agent at dosage of 0.005 weight percent of feed | Average weight per test group in grams at the indicated intervals following inoculation | | | Percent weight increase of test group | Percent control of coccidiosis and coccidial organisms |
| --- | --- | --- | --- | --- | --- |
| | 0 day | 5 days | 7 days | | |
| 4-nitro-4'-(trifluoromethyl)-carbanilide | 404 | 579 | 677 | 68 | 91 |
| Uninfected checks (Control) | 406 | 560 | 596 | 46 | (1) |
| Infected checks (Control) | 425 | 560 | 530 | 25 | (2) |

(1) No coccidial organisms or disease
(2) All birds heavily infected with coccidial organisms

EXAMPLE 4

Ninety parts by weight of 4-nitro-4'-(trifluoromethyl)carbanilide is mechanically ground with bentonite to produce a concentrate composition containing 90 percent by weight of the active compound.

In a similar manner, additional feed supplements are prepared by grinding together 50 parts by weight of the carbanilide identified hereinabove with 1 part of sorbitan monoplamitate (Span 20) and 49 parts of attapulgite clay to produce a composition containing 50 percent by weight of the active compound.

In another operation, the compound identified in the foregoing two paragraphs is dispersed in 90 parts of cottonseed oil to prepare an edible oil composition.

These compositions are adapted to be administered to animals to supply the desired dosage of active compound or to be employed as concentrates and subsequently diluted with additional edible additaments, grain rations or animal feeds to produce animal feed compositions containing the desired amount of active agent.

2,2'-methylene bis(4-chlorophenol), 4,4'-isopropylidene bis(o-cresol), 5-nitro-2-furaldehyde semicarbazone, fluroxone N-(5-nitro-2-furfurylidene-3-amino-2-oxazolidone), 3-nitro-4-hydroxyphenyl arsonic acid, p-aminobenzene arsonic acid, (1-(4-amino-2-n-propyl-5-pyrimidinylmethyl)-2-pycolinum chloride hydrochloride), the complex of 4,4'-dinitrocarbanilide and 2-hydroxy-4,6-dimethylpyrimidine, 4,5-imidazole dicarboxamide, methyl-4-acetamido-2-ethoxybenzoate, oxytetracycline, chlorotetracycline, N-(4'-chlorophenyl)-7-oxabicyclo(2.2.1)-heptane-2,3-dicarboximide, methyl-4-acetamido-2-ethoxybenzoate, tetraethyl thiuram disulfide, arsenosobenzene, 5-nitro-2-furaldehyde acetohydrazone, 2,2'-dihydroxy-3,3',5,5'-tetrachlorodiphenylsulfide, 4,6-diamino-2,2-dimethyl-1,3,5-triazine hydrochloride, sulfamethazine, sulfamerazine, sulfadimidine, 2,4-diamino-5-(p-chlorophenyl)-6-ethylpyrimidines, 2,4-diamino-5-(3,4-dichlorophenyl)-6,6-diethyl-5,6-dihydro-1,3,5-triazines, 3,5-dinitrobenzamide, 3,5-dinitro-o-toluamide, 2-chloro-4-nitrobenzamide and other analogues 2,4-diamino-5-aryl-6-alkylpyrimidines, 2,4- diamino-5-aryl-6,6-dialkyl-5,6-dihydro-1,3,5-triazines, dinitrobenzamides, dinitrotoluamides and 3,5-dichloro-2,6-dimethylpyridinol.

In representative operations, each of the feed additives identified in the preceding paragraph together with the carbanilide compound as shown in Example 4 are mechanically mixed and ground with commercial poultry mash to produce animal feed compositions. In such operations, the materials are employed in amounts sufficient to provide feed compositions containing from about 0.0045 to about 0.0125 percent by weight of one of the feed additives identified in the preceding paragraph and from about 0.001 to about 0.006 percent by weight of the carbanilide compound shown in Example 4. These compositions are of excellent value in animal husbandry and are adapted to be fed to poultry to obtain maximum normal growth and to mitigate against the attack of protozoan organisms and particularly Eimeria organisms. The carbanilide compound employed in the practice of the present invention can be prepared as follows:

4-Nitro-4'-(Trifluoromethyl)Carbanilide

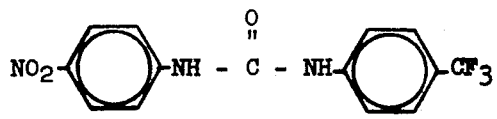

p-Nitrophenylisocyanate (8.1 grams) was dissolved in 250 milliliters of hot toluene. Thereafter 12 grams of α,α,α,-trifluoro-p-toluidine and 3 drops of triethylamine were added with agitation. The mixture was warmed slightly, cooled and filtered to remove and recover the solid product which formed. The recovered solid was washed with toluene followed by a wash with pentane and air dried. The resulting crude 4-nitro-4'-(trifluoromethyl)-carbanilide product was stirred with cold glacial acetic acid and filtered and the remaining acid was removed from the solid by evaporation. The product had a melting point of 289.3°–290.8° C., with decomposition and was found by analysis to have carbon, hydrogen and nitrogen contents of 50.95, 3.14 and 12.23 percent, respectively, as compared with the theoretical contents of 51.70, 3.10 and 12.91 percent, respectively, calculated for the named structure.

What is claimed is:

1. In the practice of animal husbandry, the method for the control of coccidial infections which comprises orally administering to animals 4-nitro-4'-(trifluoromethyl)carbanilide said compound being employed in an amount of from about 3 to about 1,000 parts per million of the dietary intake.

2. The method as defined in claim 1 wherein said 4-nitro-4'-(trifluoromethyl)carbanilide is in intimate admixture with a non-toxic carrier therefor in which the compound is stable.

3. The method of claim 1 wherein said 4-nitro-4'-(trifluoromethyl)carbanilide is administered in an amount of from about 15 to about 250 parts per million parts of dietary intake.

4. The method of claim 2 wherein said 4-nitro-4'-(trifluoromethyl)carbanilide is administered in an amount of from about 15 to about 250 parts per million parts of dietary intake.

5. A composition comprising from about 5 to 98 percent by weight of 4-nitro-4'-(trifluoromethyl)carbanilide as active agent in intimate admixture with a non-toxic carrier therefor in which the compound is stable.

6. An animal feed containing from about 0.001 to about 0.1 percent by weight of the animal feed of 4-nitro-4'-(trifluoromethyl)carbanilide.

* * * * *